Dec. 14, 1971  E. L. KUMM  3,626,692

GAS TURBINE POWER PLANT

Filed April 15, 1970  4 Sheets-Sheet 1

INVENTOR.
EMERSON L. KUMM.
By Herschel C. Omohundro
ATTORNEY

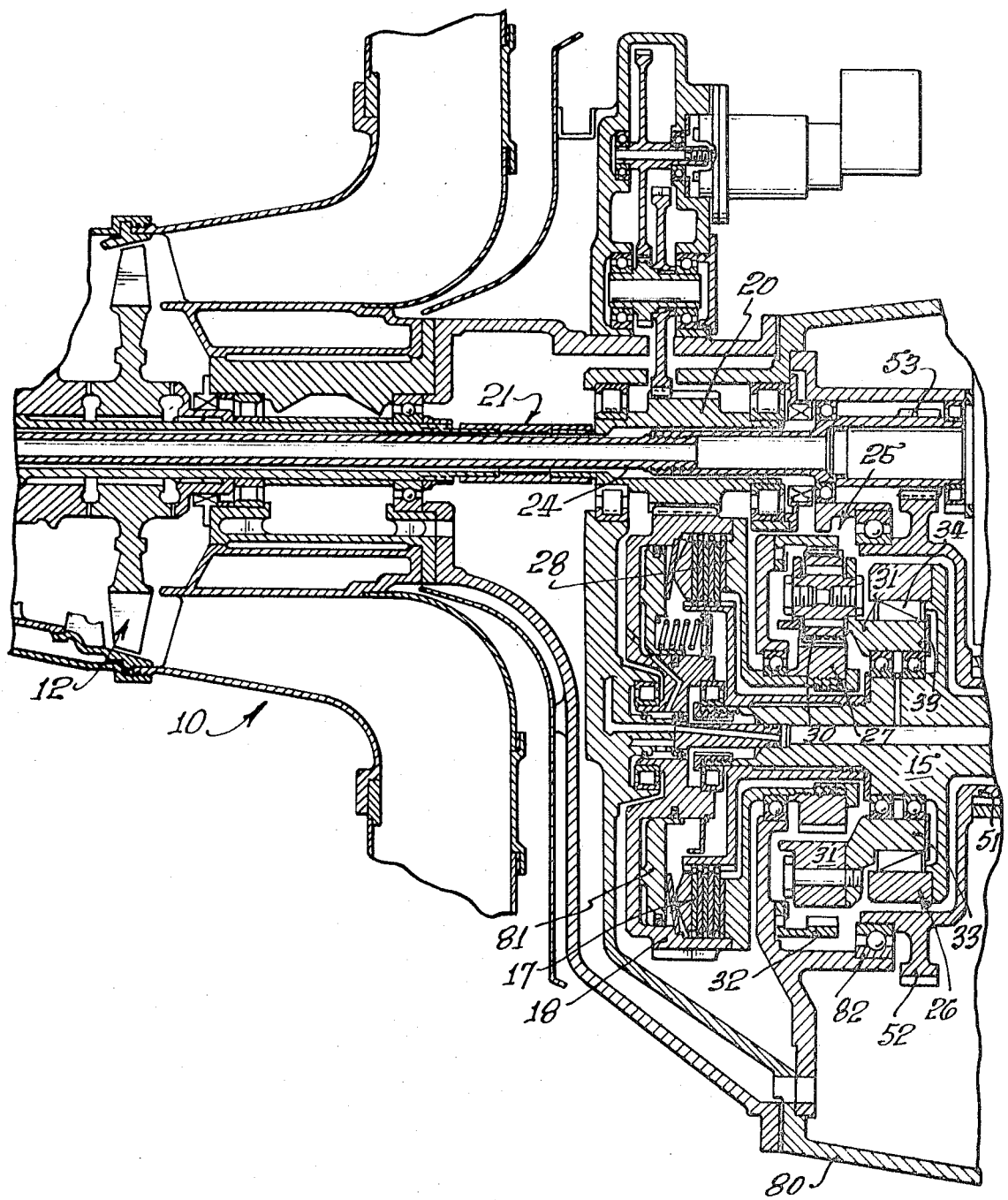

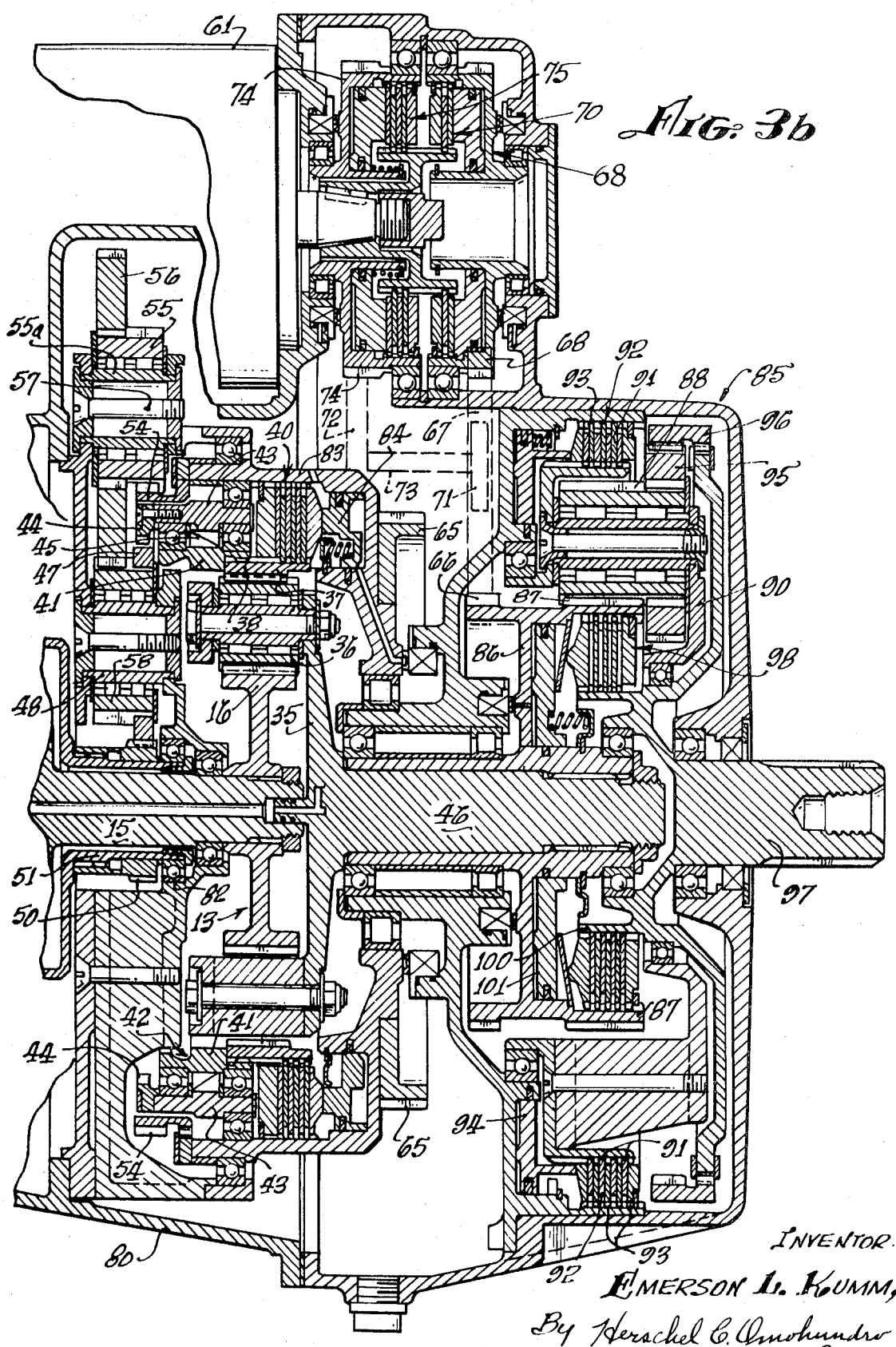

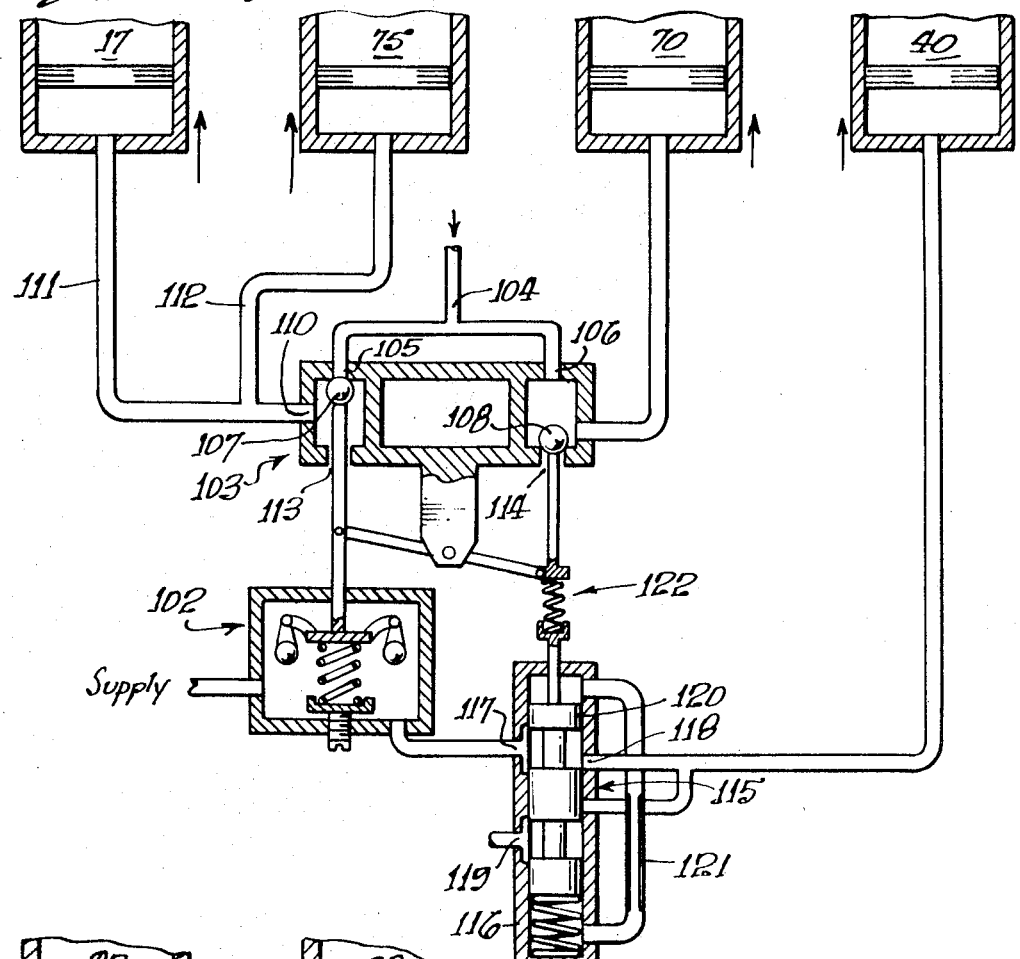
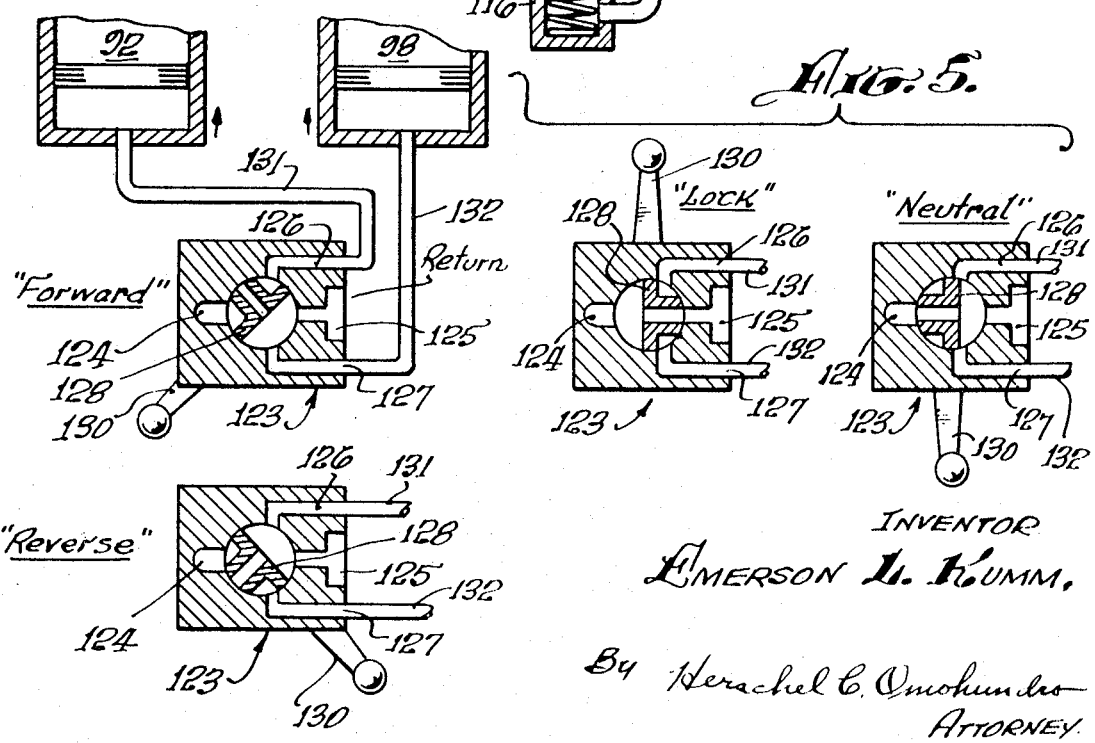

United States Patent Office 3,626,692
Patented Dec. 14, 1971

3,626,692
GAS TURBINE POWER PLANT
Emerson L. Kumm, Scottsdale, Ariz., assignor to
The Garrett Corporation, Los Angeles, Calif.
Filed Apr. 15, 1970, Ser. No. 28,817
Int. Cl. F02c 7/02
U.S. Cl. 60—39.16          16 Claims

ABSTRACT OF THE DISCLOSURE

A power plant having a gas turbine engine with separate gas generator and power turbine sections, a transmission with input and output shafts connected by differential gearing, a hydraulic power transfer loop, and power transfer means between the engine and the transmission. The power transfer means has a first set of power transfer paths selectively connecting the power turbine with the input shaft, and a second set of power transfer paths selectively connecting the gas generator section with other parts of the transmission. Both power transfer paths of each set have gear reduction trains of different ratios. Clutch means serve to selectively render certain power transfer paths of each set effective at predetermined times during the operation of the power plant. A hydraulic power transfer loop, with combination pump and motor components in motion-transmitting relation with elements of the transmission and the output shaft, serves in certain phases of operation of the power plant to deliver power from the power turbine to the output shaft, and in other phases of operation from the output shaft to the compressor. A two-speed gear section may be employed between one hydraulic component and the output shaft to increase the effectivity of power transfer at certain speeds. Control means serves during acceleration of the power plant to actuate parts of the clutch means at a certain percentage of the maximum speed of the output shaft to render certain power transfer paths effective, and other parts of the clutch means at a different percentage of the maximum output shaft speed during deceleration of the power plant to render the other power transfer paths effective.

SUMMARY

This invention relates generally to power plants of the type employing a gas turbine engine for supplying power through a transmission. More specifically, the present invention is directed to a power plant utilizing a split shaft turbine and a differential transmission integrated therewith to provide a desirable ratio of output stall torque to maximum speed output torque at the output shaft of the differential transmission and a simple control system.

An object of this invention is to provide a power plant having a gas turbine engine with separate gas generator and power turbine sections and a differential transmission connected via power transfer paths selected and arranged in such a manner that speed changes are incorporated in one path between the power turbine and the input of the differential transmission, and in other paths between the gas generator and parts of the differential transmission whereby excess torque supplied to the differential transmission by the power turbine will be fed back in part to the gas generator to improve the efficiency of the power plant.

Another object of this invention is to provide the power plant of the preceding paragraph with a hydraulic power transfer system having hydraulically connected combination pump/motor components in motion-transmitting relationship with parts of the power transfer paths from the power turbine section of the engine and the output shaft of the differential transmission so that output torque augmentation at certain phases of operation of the power plant can be secured.

A further object is to arrange in the power plant of the preceding paragraph a gear change between the pump/motor component and the output shaft to improve the operation at certain speeds, clutch or other suitable means being provided to effect the change in gear ratio at the required time.

A still further object of the invention is to provide means for selecting the paths over which power will pass from the power turbine to the differential transmission and between the gas generator and parts of the differential transmission, control means responsive to variations in output shaft speed serving to effect the selection of power transfer paths at predetermined percentages of maximum output shaft speeds whereby the shift in power ratios will take place at the most optimum times during acceleration and deceleration of the unit operated by the power plant.

Another object of the invention is to provide a power plant having a gas turbine engine with separate gas generator and power turbine sections, a differential transmission with an input shaft carrying a sun gear, an output shaft connected with a planet gear carrier, ring gear means meshing with the planet gears, a plurality of power transfer paths between both the power turbine and gas generator sections and the differential transmission, and a hydraulic power transfer loop with pump/motor components in motion-transmitting relation through a series of gears with the gas generator side of the differential transmission and the output shaft of the differential transmission.

Other objects and advantages will be apparent from the following description of a preferred form of the invention illustrated in the accompanying drawings.

IN THE DRAWINGS

FIGS. 3a and 3b provide a complete axial sectional view of a differential transmission formed in accordance with the invention;

FIG. 4 is a schematic view of a control system for switching the power plant between low- and high-speed operation; and FIG. 5 is a similar view of a control system to secure forward and reverse action of the vehicle provided with the power plant.

DESCRIPTION

Figure 1:
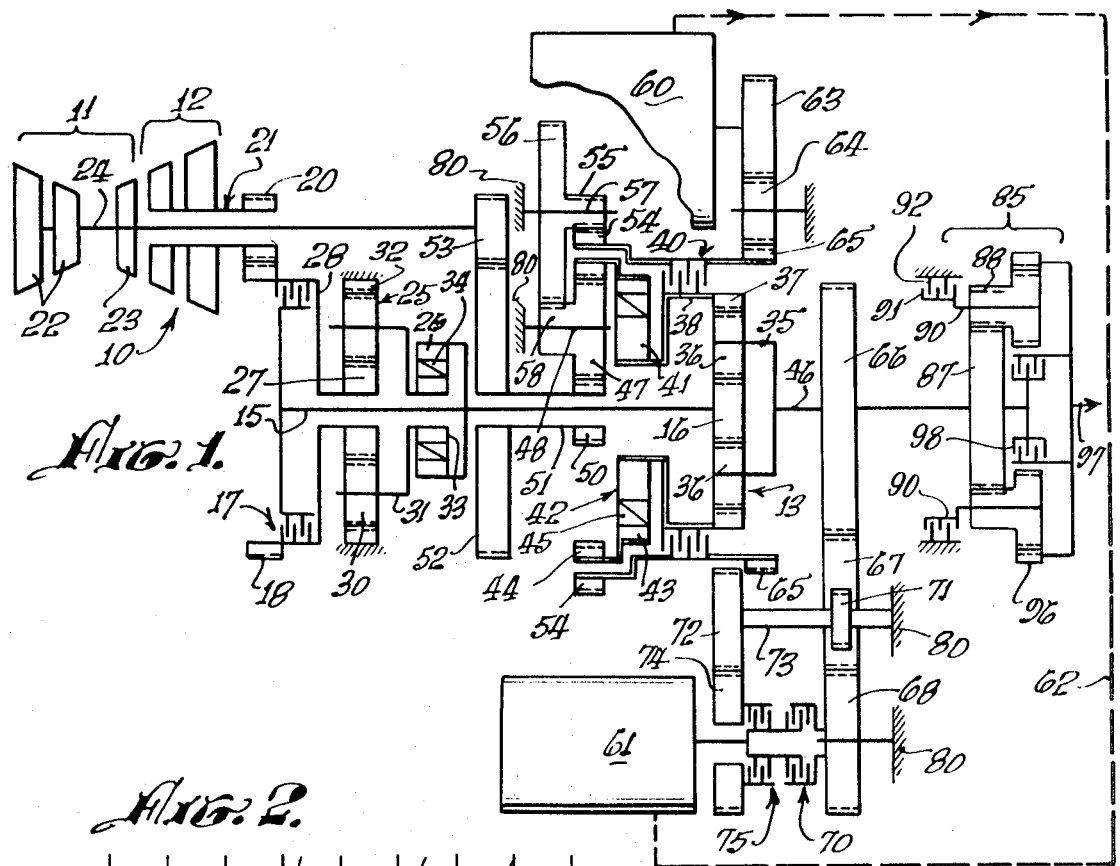
FIG. 1 is a schematic view of a power plant embodying the invention.

Referring more particularly to the drawings and especially FIG. 1, it will be observed that the power plant comprising the present invention includes a gas turbine engine, designated generally by the numeral 10, this engine having a gas generator section 11 and a power turbine section 12. The power plant further includes a planetary differential mechanism, designated generally by the numeral 13, which is connected to the gas turbine engine by a plurality of power transfer paths. The power turbine section 12 of the engine is connected with an input shaft 15 connected with the sun gear 16 of the planetary gear system through two paths, one path having a selectively operated clutch 17 which in one phase of operation of the power plant connects a ring gear 18 directly to the shaft 15, this ring gear being in meshing engagement with a pinion 20 on the shaft 21 of the power turbine section of the engine 10.

In the engine illustrated, the gas generator section comprises a plurality of stages of compression 22 connected with and driven by a first stage turbine 23 through a shaft 24. The power turbine section 12 of the engine has a plurality of stages connected with and driving the shaft 21. The clutch 17, when disengaged in a second phase of operation of the power plant, permits power to be transmitted from the power turbine 12 to the shaft 15 and sun gear 16 through a second power transfer path including a gear train 25 and an overrunning clutch 26. Gear train 25 includes a pinion 27 connected with the ring gear 18 by a part 28 of the clutch 17. Pinion 27 meshes with a plurality of gears 30 rotatably supported on a carrier 31 and meshing with a stationary ring gear 32. The carrier 31 is fixed to the internal member 33 of the overrunning clutch 26. The outer portion of this overrunning clutch is connected with the shaft 15. Sprag elements 34 between the inner and outer members of the overrunning clutch transmit movement from the former to the latter when clutch 17 is disengaged. When such clutch is engaged, the sprag elements permit the outer member to overrun the inner member.

The planetary system 13 includes a planet carrier 35 on which planet gears 36 are rotatably supported, these elements meshing with the sun gear 16 and an internal ring gear 37 connected with a part 38 of a clutch 40. The member 38 is also connected with the inner member 41 of a second overrunning clutch 42, the outer member 43 of which is connected with another internal ring gear 44. Sprag elements 45 between the inner and outer members 42 and 43 of the overrunning clutch permit relative rotary movement between such members when the mechanism is operating in a predetermined phase in which clutch 40 is engaged. The planet carrier 35 has an output shaft 46 extending therefrom. The planetary system is connected through the second overrunning clutch 42 and ring gear 44 with a gear train, including a gear 47 mounted for rotation about a stationary shaft 48 and a pinion 50 disposed on a shaft 51, this shaft in turn carrying another gear 52 in meshing engagement with a pinion 53 secured to the end of the compressor shaft 24.

When clutch 40 is disengaged, motion transmission between the ring gear 37 of the planetary gear system 13 and the gas generator section of the engine can take place over a power transfer path including part 38, the overrunning clutch 42, ring gear 44, gear 47, pinion 50, gear 52, and pinion 53. When clutch 40 is engaged, rotary motion between the planetary system and the gas generator section of the engine can take place over a different power transfer path with additional gears including an external ring gear 54, a pinion 55, and a gear 56 connected for rotation about a stationary axis 57. Gear 56 meshes with a pinion 58 secured for rotation with gear 47 about axis 48. As previously pointed out, gear 47 forms a part of the first power transfer path leading to and from the gas generator section of the engine.

It will be obvious from the description thus far that the power unit of the invention includes a gas turbine engine with gas generator and power turbine sections, a planetary transmission system, a pair of power transfer paths between the power turbine section of the engine and the sun gear of the planetary transmission, and a second pair or set of power transfer paths between the ring gear of the planetary transmission and the gas generator section of the engine.

One of the power transfer paths between the power turbine and the planetary transmission provides a direct drive through the pinion 20 and ring gear 18 to the input shaft of the planetary, while the other power transfer path includes reduction gearing with a predetermined ratio comprising gear 27, planets 30 and ring gear 32. One of the power transfer paths between the ring gear 37 of the planetary transmission and the gas generator section of the engine includes the overrunning clutch 42, a ring gear 44, gear 47, pinion 50, gear 52, and pinion 53. The other power transfer path between ring gear 37 and the gas generator section of the engine includes the clutch 40, a ring gear 54, connected pinion 55 and gear 56, connected pinion 58 and gear 47, pinion 50, gear 52, and pinion 53. It will be apparent that the last two power transfer paths have gear trains of different ratios. This permits the speed of the power turbine 12 and the gas generator 11 to be matched in both high- and low-speed modes of operation.

The power plant also includes a hydraulic transmission system having a plurality of combination pump/motor components 60 and 61, these being connected by hydraulic lines 62. The element 60 has a motion-transmitting connection with a part of the clutch 40 through gears 63, 64 and ring 65 so that the element can be driven by the power turbine section of the engine through the planetary transmission. Hydraulic component 61 has a motion-transmitting connection with output shaft 46 through either of two power transfer paths, the first including a gear 66 connected with output shaft 46, idler gears 67 and 68, and a clutch 70. When the latter clutch is engaged, motion-transmission between component 61 and shaft 46 will take place. Component 61 may alternately be connected through the second power transfer path including gears 66 and 67, a gear 71 meshing with gear 67, a gear 72 connected with gear 71 by a shaft 73, and a gear 74 which may be connected with the component 61 by another clutch 75 operative after clutch 70 is disengaged. These power transfer paths have different gear ratios and may be alternately connected through the selective operation of clutches 70 and 75.

The hydraulic transmission is provided to supply supplemental torque to the power output shaft during normal operation of the power plant and to extract torque from the output shaft and transmit it to the gas generator section of the engine during another phase of operation of the power plant or equipment driven thereby The power plant is intended primarily for the operation of road vehicles such as trucks and tractors. It is designed to give high torque at stall or low speeds and to provide a wide range of power at other speeds. As shown on the graph in FIG. 2, the power ratio from maximum speed to a predetermined percentage thereof is relatively high, the shift from high-speed to low-speed power transmission automatically occurring because of control mechanism, to be described, at such predetermined percentage point. The power remains relatively high as the output speed decreases.

Figure 2:
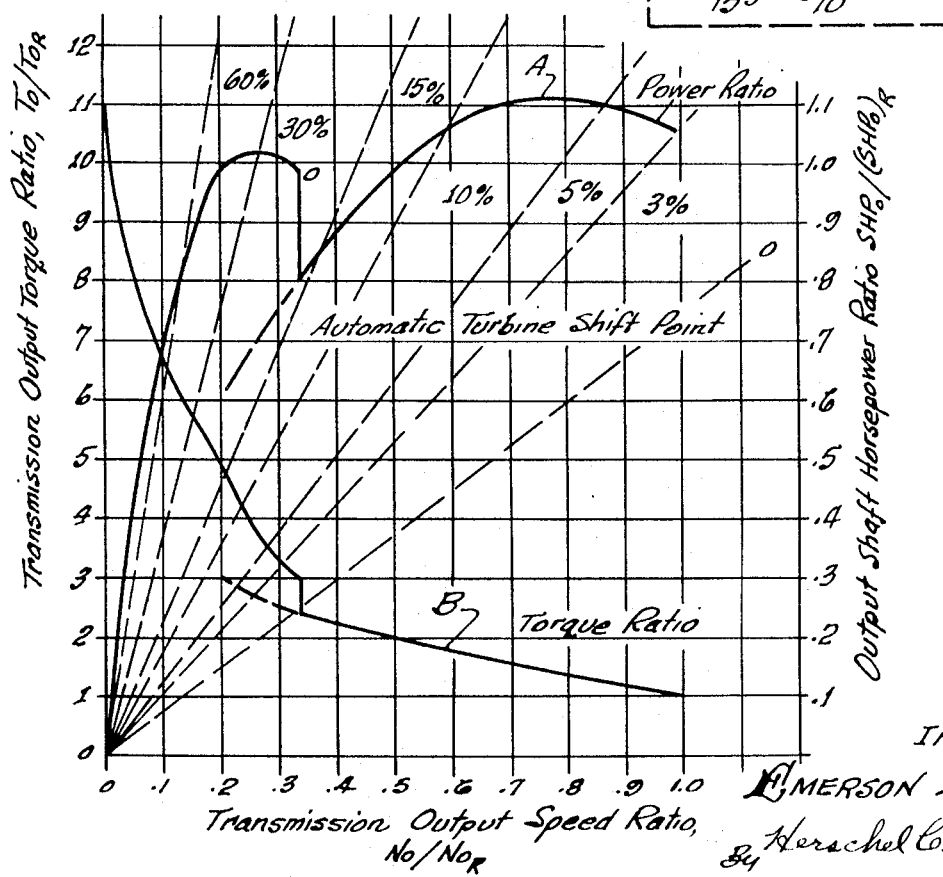
FIG. 2 is a graphcial illustration of a comparison of power plant performance with requirements.

A closer reference to FIG. 2 discloses curves A and B representing the power and torque ratios, respectively, of the power plant relative to speed. From curve A, it will be seen that as the transmission output speed increases the power ratio increases, until a predetermined percentage (approx. .25) of maximum speed is reached. When this speed is exceeded (by approx. .10), the control mechanism (shown in FIG. 4) automatically shifts to utilize other power transfer paths and the power ratio then further increases with increase in speed until approximately .75 of the maximum speed is reached. During speed reductions of the power plant, the control mechanism is set to shift at a lower percentage point (approx. .20) of the maximum speed. Curve B shows that maximum torque ratio is developed at zero or stall output speed and decreases as the speed ratio increases.

The split turbine is employed to permit use of smaller size gears, thus optimizing the size of the transmission and avoiding excessive weight.

As shown in FIGS. 3a and 3b, the transmission can be made very compact with certain parts, such as clutches 17 and 40, and overrunning clutches 26 and 42, being arranged within other parts, such as gears 18 and 52 or other elements. In FIGS. 3a and 3b the transmission is enclosed in a casing 80 disposed at the rear of the gas turbine engine 10. In FIG. 3a only the last stage of the power turbine section 12 is shown. Shaft 21 extends from this turbine section and is provided at the rear end with pinion 20 which meshes with external ring gear 18. Such gear is made hollow to receive clutch 17 and its fluid pressure responsive actuating piston 81. The clutch selected for illustration is of the plate type, alternate plates being splined to the gear 18 while the other plates are connected with shaft 15. When fluid pressure is supplied to the chamber containing piston 81, clutch 17 will be engaged and power will be transmitted directly from the power turbine 12 to shaft 15.

Shaft 24 from the gas generator section extends through hollow shaft 21 and is provided on the rear end with pinion 53. As previously pointed out, this pinion meshes with gear 52 which is connected by shaft 51 with pinion 50. This assembly is journalled in bearings 82 supported by the casing 80. The gear 52 is also made hollow to receive overrunning clutch 26. The latter element has an outer ring fixed to the shaft 15 and receiving sprag elements 34 which in turn are arranged around inner ring member 33 of the clutch 26. Ring 33 is secured to and forms a part of a floating carrier 31 for gears 30 which mesh with gear 27 and a ring gear 32 stationarily mounted in casing 80. Gear 27 is connected with ring gear 18 and revolves in unison therewith. This motion causes gears 30 to revolve and roll within ring gear 32 to impart rotary movement to carrier 31 and ring 33. As previously pointed out, the sprag elements 34 and rings of the overrunning clutch are so constructed that when clutch 17 is engaged, shaft 15 and the overrunning clutch ring connected therewith may rotate at a different rate than the inner ring 33 and gear carrier 31. When clutch 17 is disengaged, power will be transmitted by the overrunning clutch from pinion 20, ring 18, gears 27 and 30, and carrier 31 to shaft 15. The rear end of shaft 15 carries sun gear 16 which forms a part of the planetary system 13.

Gear 16 meshes with planet gears 36 which are rotatably supported on planet carrier 35 formed on the forward end of shaft 46. Gears 36 also mesh with floating ring gear 37 of the differential gear system 13, such ring gear having inner ring 41 of overrunning clutch 42 secured, or formed, for rotation therewith. Sprag elements 45 are disposed between ring 41 and outer ring 43 which, as previously described, has internal ring gear 44 connected therewith. Gear 47, which is journalled on casing 80, meshes with ring gear 44 and pinion 50 connected for rotation with gear 52. The mechanism just described provides one power transfer path between ring gear 37 of the planetary gear system and the gas generator section of the engine. A second power transfer path, as previously set forth, includes clutch 40 which has plates splined to gear 37 and other plates keyed to the housing 83 of clutch 40. A fluid pressure responsive piston 84 is received within a cylinder formed in the housing 83 for actuating the clutch 40.

Housing 83 has the external ring gear 54 connected for rotation therewith and arranged in meshing engagement with pinion 55 journalled as at 55a on the casing 80. This pinion is fixed to rotate with gear 56 which meshes with gear 58 connected to rotate with gear 47. As previously described, the latter gear forms a part of the first power transfer path cooperating with the gas generator section of the engine. It should be clear from the foregoing that when fluid pressure is applied to piston 84, clutch 40 will be engaged and power transfer path between ring gear 37 and the gas generator section of the engine through gears 54, 55, 56, 58, 47, 50, 52, and 53 will be effective.

Suitable passages may be formed in the gears, shafts, casing, and other parts to conduct fluid pressure from control means (to be described hereinafter) to the piston cylinders to effect the operation of the clutches.

In the description of the schematic view shown in FIG. 1, it is pointed out that a hydraulic power transfer loop is included in the power plant, the loop having two combination pump/motor components. Only one of such components is shown in FIG. 3b, pump/motor 61 being illustrated as supported on casing 80 with clutches 70 and 75 arranged for selective operation to effect the operation of the hydraulic loop at different gear ratios. Gear 66, connected with the differential output shaft 46, is provided, as previously pointed out, for power transmission between the element 61 and shaft 46. Gears 67, 68, 71, 72, 74 are also indicated. FIG. 3b shows clutches 70 and 75 as being fluid pressure operated, although other types of clutches could be employed equally well. The hydraulic pump/motor component 60 not appearing in FIG. 3b is operatively connected with gear 65 which is suitably carried by clutch housing 83.

The transmission shown in FIGS. 3a and 3b has a section 85 to provide for "forward," "reverse," "neutral," and "locked" phases of operation of the power plant. Section 85 is disposed at the rear end of the transmission and includes an element 86 keyed to rotate with output shaft 46 and having gear 66 formed thereon. A second gear 87 is formed on element 86 to mesh with gears 88 rotatably supported on a floating carrier 90, which also has plates 91 of a clutch or brake device 92 secured for rotation therewith. Cooperative plates 93 of device 92 are keyed to casing 80 and a fluid pressure responsive piston 94 serves to selectively activate the device 92 to hold the carrier against rotation. When so held, rotation of shaft 46 and gear 87 impart rotary movement to gears 88. Gears 95 secured for rotation with gears 88 then cause an internal ring gear 96 to revolve and effect the rotation of the final output shaft 97 in a predetermined direction. The section 85 also includes clutch means 98 which is of the fluid pressure operated type having plates splined to the inside of gear 87 and to a hub 100 formed with shaft 97. A fluid pressure responsive piston 101 is operative to actuate clutch 98 to lock members 86 and 97 together to rotate in unison in a direction opposed to the predetermined direction mentioned above. By the selective actuation of clutches 92 and 98, the direction of rotation of final output shaft 97 may be controlled. If both clutches are actuated simultaneously, shaft 97 will be locked against rotation. Should both clutches be simultaneously released, shaft 97 would be in "neutral" and capable of free rotation in either direction.

All of the clutches, i.e. 17, 40, 70, 75, 92, and 98, are illustrated as being hydraulically actuated, and one form of control means therefor is shown in FIGS. 4 and 5. In the former figure, an automatic control has been illustrated having a governor 102 responsive to output shaft rotation to effect the control of certain sets of clutches at predetermined shaft speed. Governor 102 is arranged to actuate a selector valve 103 at a certain shaft speed. Valve 103 has an inlet 104 to receive fluid under pressure from a suitable source and direct it to ports 105 and 106. Valve elements 107 and 108 are provided to control the admission of fluid through such ports. Port 105, when open, communicates with port 110 which is connected by lines 111 and 112 with the actuator piston chambers of clutches 17 and 75. Fluid pressure supplied to such chambers will actuate or engage these clutches and render power transfer paths controlled thereby effective. For example, when valve 107 is disposed to open port 105, clutch 17 will be engaged and the power turbine 12 will be directly connected with the sun gear 16 through pinion 20, ring gear 18, and shaft 15. When valve 107 is disposed to open port 105, it will close a drain port 113 for lines 111 and 112. Fluid pressure supplied to line 112 serves to engage clutch 75 to render a predetermined gear transmission path between pump/motor 61 and the output shaft 46 effective, this gear ratio being the optimum for the hydraulic power transfer loop when the power turbine directly drives the differential input shaft.

At a predetermined output shaft speed, governor 102 will move valve element 107 to close valve port 105 and open drain port 113 to permit disengagement of clutches 17 and 75. This action of the governor also causes valve element 108 to open valve port 106 and direct fluid under pressure to clutch 70, valve element 108 at the same time closing drain port 114. A switching delay valve 115 is connected for operation by governor 102 during, or just subsequent to, the opening movement of valve element 108. Valve 115 includes a casing 116 with inlet, work, and drain ports 117, 118 and 119, respectively. A spool element 120 is disposed for movement in casing 116 to alternately connect the work port 118 with the inlet and drain ports. The opposite ends of the casing communicate via a capillary passage 121 to retard the movement of the spool so that the operation of clutch 40 which is supplied through work port 118 will lag that of the other clutches. A lost-motion connection 122 is provided between spool 120 and governor 102 to permit this action. The clutch operation lag is necessary to prevent the turbine sections from being unloaded and reaching runaway speeds during the gear shifting operation. It will be apparent from FIG. 4 that valve elements 107 and 108 are automatically moved to alternately open and close ports 105 and 106 and that the work port 118 is alternately disconnected and reconnected with the pressure supply just subsequent to the opening and closing of port 105. In this manner the predetermined power transfer paths of the first and second sets are rendered effective at the appropriate speeds of the differential output shaft.

In group FIG. 5, a control means for clutches 92 and 98 has been schematically illustrated. This control means includes a four-position rotary valve 123 having an inlet, a drain, and two cylinder ports 124, 125, 126, 127, respectively. A rotor element 128 is disposed in the valve casing for movement by lever 130. Cylinder ports 126 and 127 are connected, respectively, by lines 131 and 132 with the actuator cylinders of clutches 92 and 98. By properly positioning lever 130, the inlet can be connected with either cylinder port 126 or 127 and the other of such ports connected with the drain port to effect forward or reverse operation of the final output shaft 97. Lever 130 may also be disposed, as indicated by the legends in FIG. 5, to place the rotor element 128 in position to lock shaft 97 against rotation or to disengage both clutches 92 and 98 (neutral) and permit shaft 97 to rotate freely in either direction. Other types of control may be employed without departing from this invention.

As previously pointed out, the engine 10 in the embodiment of the invention illustrated, has the compressor connected for operation by the first or high-pressure stage turbine, while the power turbine section comprises the second and third or low-pressure stage turbines. In this arrangement, approximately one third of the design total turbine output power, which is less than required by the compressor, is supplied to the compressor, while the other two thirds of the design power is supplied to the differential transmission at the design point operation. As a result of this turbine split, some of the power from the power turbine section, during operation of the plant at or near maximum design power, is delivered through the ring gear of the differential transmission and over one of the power transfer paths to the gas generator. When the power plant is operating in the low part power regime the high-pressure stage turbine will deliver more than one third of the total turbine output power, and because of the arrangement of power transfer mechanism, some of the power from the high-pressure turbine may then be delivered over one of the power transfer paths to the ring gear and through the hydraulic loop to the output shaft. The turbine split and power transmission selected permits the use of small gears with optimum system efficiency.

I claim:

1. A power plant, comprising:
    (a) a gas turbine engine having separate gas generator and power turbine sections;
    (b) a differential gear mechanism with an input shaft, an output shaft, differential gear means connecting said shafts, and means for varying the torque transmitted from said input to said output shaft, such means serving to extract excess torque supplied to said input shaft and transmit it to a predetermined point of use;
    (c) means providing a set of power transfer paths between the power turbine section of said engine and the input shaft of said differential gear mechanism, one of said power transfer paths having a reduction gear train therein;
    (d) means operative to render a selected power transfer path effective during predetermined speeds of the output shaft, the other path being effective during the other output shaft speeds;
    (e) means providing a second set of power transfer paths between the torque varying means of said differential gear mechanism and the gas generator section of said engine, the paths of said second set having gear trains with different ratios;
    (f) means operative to render a selected power transfer path of said second set effective at predetermined speeds of the output shaft, the other path of said second set being effective during the other output shaft speeds; and
    (g) a hydraulic power transfer means in motion transmitting connection with the operative power transfer path of said second set and the output shaft of said differential gear mechanism to transfer power from one to the other during operation of the power plant.

2. A power plant as set forth in claim 1 in which the means for rendering a selected power transfer path of said first-mentioned set effective includes a clutch means.

3. A power plant as set forth in claim 2 in which an overrunning clutch is incorporated in one of the power transfer paths of said first-mentioned set to compensate for differences in rates of rotation of predetermined parts when the other power transfer path of such set is effective.

4. A power plant as set forth in claim 1 in which the differential gear mechanism is of the planetary type having a sun gear on the input shaft, a planet carrier connected with said output shaft, and a ring gear meshing with planet gears on said planet carrier.

5. A power plant as set forth in claim 4 in which each of the power transfer paths of the second set includes a ring gear; and selectively operable clutch means for establishing a driving connection between a predetermined ring gear and said differential gear mechanism.

6. A power plant as set forth in claim 5 in which one of the power transfer paths of the second set includes an overrunning clutch to compensate for differences in rates of rotation between predetermined parts when said selectively operable clutch is engaged.

7. A power plant as set forth in claim 1 in which the motion-transmitting connection between the hydraulic power transfer means and the output shaft of said differential gear mechanism has two power transfer paths, one having a gear train of predetermined ratio therein.

8. A power plant as set forth in claim 7 in which means are provided for rendering effective a predetermined power transfer path in the connection between said hydraulic power transfer means and the output shaft of the differential gear mechanism.

9. A power plant as set forth in claim 1 in which means are provided in connection with said output shaft for reversing the direction of output torque.

10. A power plant as set forth in claim 9 in which means are provided for selecting the direction of output torque.

11. A power plant as set forth in claim 10 in which the output torque direction selecting means comprises clutch means.

12. A power plant as set forth in claim 3 in which the means for rendering a selected power transfer path of the second set effective includes a clutch means; the motion-transmitting connection between the hydraulic power transfer means and the output shaft of said differential gear mechanism has two power transfer paths with gear trains of different ratios; clutch means for rendering a selected one of the last-mentioned power transfer paths effective; and control means for simultaneously operating certain of said clutch means and thereafter operating other clutch means.

13. A power plant as set forth in claim 1 in which the gas generator section of the gas turbine engine has the compressor connected for operation by the first turbine stage and the power turbine section comprises subsequent turbine stages.

14. A power plant as set forth in claim 1 in which the gas generator section of the gas turbine engine has the compressor connected for operation by the high-pressure stage portion of the turbine and the power turbine section comprises the low-pressure stage portion.

15. A power plant as set forth in claim 1 in which the gas generator section of the gas turbine engine has the compressor thereof connected for operation by a portion of the turbine section of the engine, which during operation of the power plant at maximum design power, develops less power than required by the compressor and the power turbine section develops an excess of power, and the differential gear mechanism and power transfer path providing means cooperate to apply a portion of the power from the power turbine section to the compressor.

16. A power plant as set forth in claim 13 in which the first turbine stage of the gas turbine engine develops substantially one third of the maximum design power during operation of the power plant at maximum design power and the subsequent turbine stages develop the remainder of the design power.

References Cited
UNITED STATES PATENTS

| | | | |
|---|---|---|---|
| 3,498,057 | 3/1970 | Kronogard et al. | 60—39.16 |
| 3,488,947 | 1/1970 | Miller et al. | 60—39.16 |
| 3,286,543 | 11/1966 | Porter | 60—39.16 |

BENJAMIN W. WYCHE, Primary Examiner

W. E OLSEN, Assistant Examiner

U.S. Cl. X.R.

74—687